United States Patent
Wang et al.

(10) Patent No.: US 11,347,386 B2
(45) Date of Patent: May 31, 2022

(54) METHOD AND DEVICE FOR SHARING POSITION

(71) Applicant: BEIJING BAIDU NETCOM SCIENCE AND TECHNOLOGY CO., LTD., Beijing (CN)

(72) Inventors: Ziji Wang, Beijing (CN); Jiefeng Sun, Beijing (CN); Dong Liu, Beijing (CN); Jiqing Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 168 days.

(21) Appl. No.: 16/337,872

(22) PCT Filed: Feb. 21, 2017

(86) PCT No.: PCT/CN2017/074312
§ 371 (c)(1),
(2) Date: Mar. 28, 2019

(87) PCT Pub. No.: WO2018/058889
PCT Pub. Date: Apr. 5, 2018

(65) Prior Publication Data
US 2020/0026418 A1    Jan. 23, 2020

(30) Foreign Application Priority Data
Sep. 29, 2016    (CN) .................... 201610867219.0

(51) Int. Cl.
*G06F 3/04845*    (2022.01)
*G01C 21/26*    (2006.01)
(Continued)

(52) U.S. Cl.
CPC ......... *G06F 3/04845* (2013.01); *G01C 21/26* (2013.01); *G06F 3/0481* (2013.01); *G06F 40/205* (2020.01); *H04L 67/18* (2013.01)

(58) Field of Classification Search
CPC .. G06F 40/169; G06F 3/04845; G06F 40/205; G06F 3/0481; G06F 16/29;
(Continued)

(56) References Cited

U.S. PATENT DOCUMENTS

| | | | | |
|---|---|---|---|---|
| 6,564,254 B1 * | 5/2003 | Shoji | ..................... | G06F 16/951 709/217 |
| 6,658,463 B1 * | 12/2003 | Dillon | ............... | H04L 29/12132 709/203 |

(Continued)

FOREIGN PATENT DOCUMENTS

| | | |
|---|---|---|
| CN | 1845094 A | 10/2006 |
| CN | 103049477 A | 4/2013 |

(Continued)

OTHER PUBLICATIONS

PCT/CN2017/074312 English translation of International Search Report dated Jul. 6, 2017; 2 pages.

(Continued)

*Primary Examiner* — Jennifer N Welch
*Assistant Examiner* — Le V Nguyen
(74) *Attorney, Agent, or Firm* — Lathrop GPM LLP

(57) ABSTRACT

Disclosed are a method and a device for sharing a position. The method comprises: obtaining geographic information and an intent to share corresponding to a marked position on a panoramic map; setting the geographic information and the sharing intention in a pre-set sharing link; and sending the preset sharing link through a pre-set system interface corresponding to a target application.

17 Claims, 8 Drawing Sheets

(51) Int. Cl.
*G06F 16/29* (2019.01)
*G06F 40/205* (2020.01)
*G06F 3/0481* (2022.01)
*H04L 67/52* (2022.01)

(58) Field of Classification Search
CPC . H04L 41/22; H04L 12/1813; H04L 12/1822; H04L 67/18; H04N 7/15; G01C 21/26
See application file for complete search history.

(56) References Cited

U.S. PATENT DOCUMENTS

| | | | | |
|---|---|---|---|---|
| 8,767,986 | B1* | 7/2014 | Fabry | H04R 25/70 |
| | | | | 381/314 |
| 9,158,414 | B1* | 10/2015 | Gluzberg | G06F 3/0488 |
| 10,685,416 | B2* | 6/2020 | Tolkin | G06Q 50/30 |
| 2006/0025119 | A1* | 2/2006 | Guida | H04L 51/066 |
| | | | | 455/414.4 |
| 2009/0240431 | A1 | 9/2009 | Chau et al. | |
| 2012/0033032 | A1 | 2/2012 | Kankainen | |
| 2013/0064427 | A1* | 3/2013 | Picard | A61B 34/20 |
| | | | | 382/103 |
| 2013/0326380 | A1* | 12/2013 | Lai | G01C 21/32 |
| | | | | 715/765 |
| 2014/0312113 | A1 | 10/2014 | Ma et al. | |
| 2014/0365901 | A1* | 12/2014 | Moha | H04W 4/00 |
| | | | | 715/738 |
| 2016/0036887 | A1* | 2/2016 | Ilic | H04L 67/22 |
| | | | | 709/206 |
| 2016/0155253 | A1 | 6/2016 | Lo | |
| 2017/0276497 | A1* | 9/2017 | Andrew | G01C 21/3641 |
| 2017/0277670 | A1* | 9/2017 | Smith | G06F 3/04845 |

FOREIGN PATENT DOCUMENTS

| | | |
|---|---|---|
| JP | 2008165331 A | 7/2008 |
| JP | 2015537264 A | 12/2015 |
| KR | 20090001477 A | 1/2009 |
| WO | WO 2008147561 A2 | 12/2008 |

OTHER PUBLICATIONS

Korean Patent Application No. 10-2019-7010773 Office Action dated Jul. 17, 2020, 8 pages.
Korean Patent Application No. 10-2019-7010773 English translation of Office Action dated Jul. 17, 2020, 11 pages.
Indian Patent Application No. 201917014789 Office Action dated Jan. 25, 2021, 7 pages.
European Patent Application No. 17854349.2 extended Search and Opinion dated Mar. 30, 2020, 7 pages.
Japanese Patent Application No. 2019-504720 Office Action dated Mar. 10, 2020, 4 pages.
Singapore Patent Application No. 11201902731T Office Action dated Mar. 31, 2020, 9 pages.

* cited by examiner

US 11,347,386 B2

METHOD AND DEVICE FOR SHARING POSITION

CROSS REFERENCE TO RELATED APPLICATION

This application is a National phase of International Application No. PCT/CN2017/074312 filed Feb. 21, 2017, which claims priority to Chinese Patent Application Serial No. 201610867219.0, titled with "method, device and system for sharing position" and filed on Sep. 29, 2016 by BEIJING BAIDU NETCOM SCIENCE AND TECHNOLOGY CO., LTD., the content of which is incorporated herein by reference.

FIELD

The present disclosure relates to a field of navigation technologies, and more particularly to a method, and a device for sharing a position.

BACKGROUND

With the development of the technology, map navigation has become a common function in user's production and life. However, with the increase of utilization of the map navigation function, the user' demand is becoming more diverse. For example, in some application scenes, the user may have a demand for sharing a position that interests the user on a social platform.

In the related art, the position shared by the user on the social platform merely includes two-dimensional coordinate information of the position shared by the user on a planar map. For example, the user may share two-dimensional coordinate information of a hospital where the user is located with other users on a chat tool.

However, the information expressed by the two-dimensional coordinate information is limited, and the two-dimensional coordinate information is abstract for the user. The above method for sharing the position cannot express an intent to share of the user intuitively, and has a higher limitation.

SUMMARY

The present disclosure aims to solve one of the foregoing technical problems to at least some extent.

Accordingly, a first objective of the present disclosure is to provide a method for sharing a position, which may mark a shared position based on a panoramic map and add description information for the shared position, such that an intent to share and the shared position are embodied intuitively, and practicality of sharing a position is improved.

A second objective of the present disclosure is to provide another method for sharing a position.

A third objective of the present disclosure is to provide a device for sharing a position.

A fourth objective of the present disclosure is to provide another device for sharing a position.

A fifth objective of the present disclosure is to provide a system for sharing a position.

A sixth objective of the present disclosure is to provide a still device for sharing a position.

A seventh objective of the present disclosure is to provide a further device for sharing a position.

An eighth objective of the present disclosure is to provide a non-transitory computer readable storage medium.

A ninth objective of the present disclosure is to provide another non-transitory computer readable storage medium.

A tenth objective of the present disclosure is to provide a computer program product.

An eleventh objective of the present disclosure is to provide another computer program product.

To achieve the above objectives, a first aspect of embodiments of the present disclosure provides a method for sharing a position, including following steps: obtaining geographic information and an intent to share corresponding to a marked position on a panoramic map; setting the geographic information and the intent to share in a preset sharing link; and sending the preset sharing link through a preset system interface corresponding to a target application.

With the method for sharing the position according to embodiments of the present disclosure, the geographic information and the intent to share corresponding to the marked position on the panoramic map are obtained, the geographic information and the intent to share are set in the preset sharing link, and the preset sharing link is sent through the preset system interface corresponding to the target application. In this way, the shared position is marked based on the panoramic map and the description information may be added for the shared position, thus embodying the intent to share and the shared position intuitively, and improving the practicality of sharing the position.

In addition, the method for sharing the position according to embodiments of the present disclosure further has following additional technical features.

In an embodiment of the present disclosure, obtaining the geographic information and the intent to share corresponding to the marked position on the panoramic map, includes: receiving a position sharing request sent by a user, and providing a marked icon and a text editing entry on a panoramic map interface; determining the marked position by dragging by the user the marked icon on the panoramic map, and determining the intent to share based on an input from the user through the text editing entry; and calculating the geographic information of the marked position based on a back-projection algorithm.

In an embodiment of the present disclosure, setting the geographic information and the intent to share in the preset sharing link, includes: editing the geographic information and the intent to share according to a preset character format to acquire an edited character string; performing a coding operation on the edited character string according to a preset coding format to acquire a coded character string; and setting the coded character string in the preset sharing link.

In an embodiment of the present disclosure, after setting the geographic information and the intent to share in the preset sharing link, the method further includes: obtaining scene information corresponding to the marked position; setting the scene information in the preset sharing link.

In an embodiment of the present disclosure, sending the preset sharing link through the preset system interface corresponding to the target application, includes: performing compression processing on the preset sharing link based on a preset compression algorithm to acquire a compressed sharing link, and sending the compressed sharing link through the preset system interface corresponding to the target application.

To achieve the above objectives, a second aspect of embodiments of the present disclosure provides a method for sharing a position, including following steps: receiving a sharing link in a target application, and parsing the sharing link to obtain geographic information and an intent to share; and drawing a corresponding marked position on a panoramic map based on the geographic information, and displaying the intent to share.

With the method for sharing the position according to embodiments of the present disclosure, the sharing link is received in the target application, and the sharing link is parsed to obtain the geographic information and the intent to share; and the corresponding marked position is drawn on the panoramic map based on the geographic information, and the intent to share is displayed. In this way, the shared position is drawn accurately based on the panoramic map, and the intent to share may be acquired intuitively, thus improving the practicality of sharing the position.

In addition, the method for sharing the position according to embodiments of the present disclosure further has following additional technical features.

In an embodiment of the present disclosure, parsing the sharing link to obtain the geographic information and the intent to share includes: performing decompression processing on the sharing link based on a preset decompression algorithm to acquire a decompressed sharing link; parsing the decompressed sharing link, to obtain a coded character string; decoding the coded character string based on a preset decoding format to obtain the geographic information and the intent to share.

In an embodiment of the present disclosure, drawing the corresponding marked position on the panoramic map based on the geographic information, includes: parsing the sharing link to obtain scene information; drawing the corresponding marked position on the panoramic map based on the scene information and the geographic information.

To achieve the above objectives, a third aspect of embodiments of the present disclosure provides a device for sharing a position, including: a first obtaining module, configured to obtain geographic information and an intent to share corresponding to a marked position on a panoramic map; a setting module, configured to set the geographic information and the intent to share in a preset sharing link; and a sending module, configured to send the preset sharing link through a preset system interface corresponding to a target application.

With the device for sharing the position according to embodiments of the present disclosure, the geographic information and the intent to share corresponding to the marked position on the panoramic map are obtained, the geographic information and the intent to share are set in the preset sharing link, and the preset sharing link is sent through the preset system interface corresponding to the target application. In this way, the shared position is marked based on the panoramic map and the description information may be added for the shared position, thus embodying the intent to share and the shared position intuitively, and improving the practicality of sharing the position.

In addition, the device for sharing the position according to embodiments of the present disclosure further has following additional technical features.

In an embodiment of the present disclosure, the first obtaining module includes: a receiving unit, configured to receive a position sharing request sent by a user; a providing unit, configured to provide a marked icon and a text editing entry on a panoramic map interface; a determining unit, configured to determine the marked position by dragging by the user the marked icon on the panoramic map, and to determine the intent to share based on an input from the user through the text editing entry; and a calculating unit, configured to calculate the geographic information of the marked position based on a back-projection algorithm.

In an embodiment of the present disclosure, the setting module includes: a first processing unit, configured to edit the geographic information and the intent to share according to a preset character format to acquire an edited character string; the first processing unit is further configured to perform a coding operation on the edited character string according to a preset coding format to acquire a coded character string; and a setting unit, configured to set the coded character string in the preset sharing link.

In an embodiment of the present disclosure, the device further includes: a second obtaining module, configured to obtain scene information corresponding to the marked position; the setting module is further configured to set the scene information in the preset sharing link.

In an embodiment of the present disclosure, the sending module is further configured to perform compression processing on the preset sharing link based on a preset compression algorithm to acquire a compressed sharing link, and send the compressed sharing link through the preset system interface corresponding to the target application.

To achieve the above objectives, a fourth aspect of embodiments of the present disclosure provides another device for sharing a position, including: a receiving module, configured to receive a sharing link in a target application; a parsing module, configured to parse the sharing link to obtain geographic information and an intent to share; a drawing module, configured to draw a corresponding marked position on a panoramic map based on the geographic information; and a display module, configured to display the intent to share.

With the device for sharing the position according to embodiments of the present disclosure, the sharing link is received in the target application, and the sharing link is parsed to obtain the geographic information and the intent to share; and the corresponding marked position is drawn on the panoramic map based on the geographic information, and the intent to share is displayed. In this way, the shared position is drawn accurately based on the panoramic map, and the intent to share may be acquired intuitively, thus improving the practicality of sharing the position.

In addition, the device for sharing the position according to embodiments of the present disclosure further has following additional technical features.

In an embodiment of the present disclosure, the parsing module includes: a second processing unit, configured to perform decompression processing on the sharing link based on a preset decompression algorithm to acquire a decompressed sharing link; a first obtaining unit, configured to parse the decompressed sharing link to obtain a coded character string; a second obtaining unit, configured to decode the coded character string based on a preset decoding format to obtain the geographic information and the intent to share.

In an embodiment of the present disclosure, the drawing module includes: a parsing unit, configured to parse the sharing link to obtain scene information; a drawing unit, configured to draw the corresponding marked position on the panoramic map based on the scene information and the geographic information.

To achieve the above objectives, a fifth aspect of embodiments of the present disclosure provides a system for sharing a position, including: a sharing terminal and a receiving terminal, in which, the sharing terminal includes the device for sharing the position disclosed in the third aspect of embodiments of the present disclosure, and the receiving terminal includes the device for sharing the position disclosed in the fourth aspect of embodiments of the present disclosure.

With the system for sharing the position according to embodiments of the present disclosure, the receiving terminal obtains the geographic information and the intent to share corresponding to the marked position on the panoramic map from the sharing terminal; the sharing terminal sets the geographic information and the intent to share in the preset sharing link and sends the preset sharing link to the receiving terminal through the preset system interface corresponding to the target application. In this way, the shared position is marked based on the panoramic map and the description information may be added for the shared position, thus embodying the intent to share and the shared position intuitively, and improving the practicality of sharing the position.

To achieve the above objectives, a sixth aspect of embodiments of the present disclosure provides a device for sharing a position, including: a processor; a memory, configured to store instructions executable by the processor; the processor is configured to: obtain geographic information and an intent to share corresponding to a marked position on a panoramic map; set the geographic information and the intent to share in a preset sharing link; and send the preset sharing link through a preset system interface corresponding to a target application.

To achieve the above objectives, a seventh aspect of embodiments of the present disclosure provides a device for sharing a position, including: a processor; a memory, configured to store instructions executable by the processor; the processor is configured to: receive a sharing link in a target application, and parse the sharing link to obtain geographic information and an intent to share; and draw a corresponding marked position on a panoramic map based on the geographic information, and display the intent to share.

To achieve the above objectives, an eighth aspect of embodiments of the present disclosure provides a non-transitory computer readable storage medium. When instructions in the storage medium are executed by a processor of the mobile terminal, the mobile terminal may be caused to execute a method for sharing a position, and the method includes: obtaining geographic information and an intent to share corresponding to a marked position on a panoramic map; setting the geographic information and the intent to share in a preset sharing link; and sending the preset sharing link through a preset system interface corresponding to a target application.

To achieve the above objectives, a ninth aspect of embodiments of the present disclosure provides a non-transitory computer readable storage medium. When instructions in the storage medium are executed by a processor of the mobile terminal, the mobile terminal may be caused to execute a method for sharing a position, and the method includes: receiving a sharing link in a target application, and parsing the sharing link to obtain geographic information and an intent to share; and drawing a corresponding marked position on a panoramic map based on the geographic information, and displaying the intent to share.

To achieve the above objectives, a tenth aspect of embodiments of the present disclosure provides a computer program product. When instructions in the computer program product are executed by a processor, a method for sharing a position is executed. The method includes: obtaining geographic information and an intent to share corresponding to a marked position on a panoramic map; setting the geographic information and the intent to share in a preset sharing link; and sending the preset sharing link through a preset system interface corresponding to a target application.

To achieve the above objectives, an eleventh aspect of embodiments of the present disclosure provides a computer program product. When instructions in the computer program product are executed by a processor, a method for sharing a position is executed. The method includes: receiving a sharing link in a target application, and parsing the sharing link to obtain the geographic information and the intent to share; and drawing the corresponding marked position on the panoramic map based on the geographic information, and displaying the intent to share.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Description will be made in detail below to embodiments of the present disclosure. Examples of embodiments are illustrated in the accompanying drawings, in which, the same or similar numbers represent the same or similar elements or elements with the same or similar functions. Embodiments described below with reference to the accompanying drawings are exemplary, which are intended to explain the present disclosure and do not be understood a limitation of the present disclosure.

A method, a device and a system for sharing a position provided in embodiments of the present disclosure will be described below with reference to the accompanying drawings.

Usually, in order to satisfy a demand for sharing a position under some application scenes, in the related art, a position sharing way of a two-dimensional coordinate or an interest point is provided. That is, a two-dimensional coordinate of the shared position and a name of the interest point may be taken as parameters to be spliced in a sharing link for sharing.

However, in an interest point database of a digital map, only interest points such as buildings, restaurants may be included, while road information such as crossroads and street lights cannot be included. Therefore, a method of sharing the position based on the interest points has a greater limitation, which cannot share the road information such as the crossroads. In addition, the two-dimensional coordinate of the shared position is quite abstract, such that the user viewing the shared position may not understand the intent to share of the sharing user intuitively.

To solve the above problems, the present disclosure provides a method for sharing a position. For ease of description, embodiments focused on a sharing terminal are described as follows.

It should be understood that, in order to display the shared position more intuitively, the method for sharing the position provided in embodiments of the present disclosure is applied to a panoramic map. That is because the panoramic map is spliced by pictures of the real world, which may reflect image information surrounding a certain position truthfully and objectively. Further, a true experience of a three-dimensional space can be acquired in the panoramic map, thereby the displayed panoramic image can be freely rotated and scaled.

Figure 1:
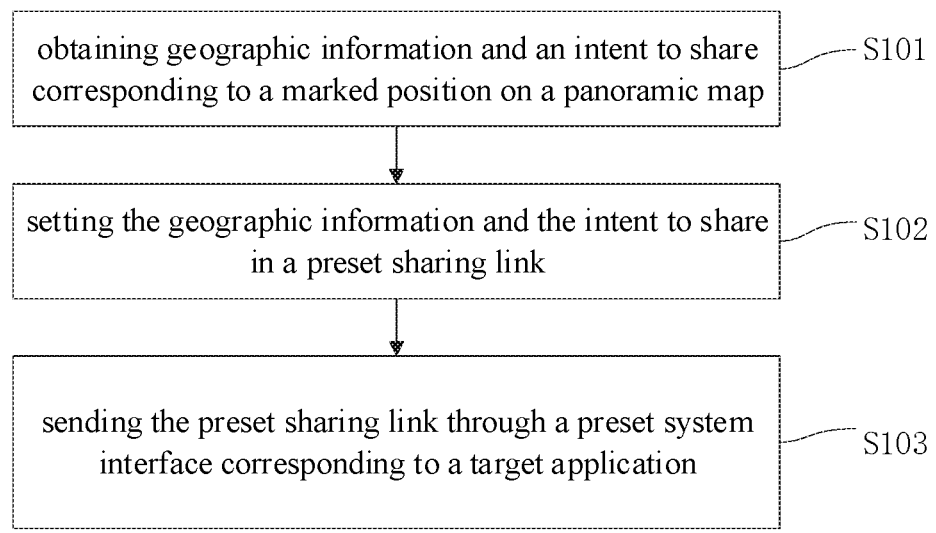
FIG. 1 is a flow chart illustrating a method for sharing a position according to an embodiment of the present disclosure.

FIG. 1 is a flow chart illustrating a method for sharing a position according to an embodiment of the present disclosure. As illustrated in FIG. 1, the method for sharing the position includes following blocks.

In block S101, geographic information and an intent to share corresponding to a marked position on a panoramic map are obtained.

In detail, in order to find the shared position accurately, unique geographic information indicating the marked position is obtained in the panoramic map, and in order to present the sharing purpose intuitively, the intent to share corresponding to the marked position on the panoramic map is obtained.

Under different application scenes, the unique geographic information indicating the marked position may include different geographic parameters of the marked position, such as a coordinate, height of the marked position.

In addition, the above intent to share is configured to embody the sharing purpose intuitively, and may include text description information, speech description information, animation description information and image description information for the marked position, which are not enumerated herein.

It should be illustrated that, based on the different application scenes, the ways of obtaining the geographic information and the intent to share corresponding to the marked position are different, which will be described as follows.

In a first example, an editing entry for adding the intent to share and an icon indicating the marked position may be provided on the panoramic map, such that the marked position can be determined by moving the icon to the corresponding position and the geographic information of the marked position can be calculated by employing a related algorithm, and that the intent to share can be inputted through triggering the editing entry.

In a second example, an intent to share description box is set in advance at a corresponding position of the panoramic map. For example, the intent to share description box is set in the center of the panoramic map. Further, a marked position determining action is set in advance, such as double clicking, clicking.

Accordingly, in the example, the marked position may be determined by executing the preset action in the related position of the panoramic map, the geographic information of the marked position is calculated by employing a related algorithm, and the description information is input to the intent to share description box to determine the intent to share.

In a third example, a speech receiving entry may be set in advance on the panoramic map, and a determining trajectory of the marked position is set in advance, such as a closed curve.

Accordingly, in the example, the intent to share is determined by inputting by the user the speech information in the speech receiving entry on the panoramic map interface, the marked position is determined by inputting by the user a related trajectory at a related position of the panoramic map, and the geographic information of the marked position is calculated by employing the related algorithm.

In a fourth example, the editing entry for adding the intent to share and the inputting entry for inputting the geographic information of the marked position are provided in advance on the panoramic map, such that the geographic information of the marked position is input in the inputting entry for inputting the geographic information, and the intent to share is input through triggering the editing entry.

In block S102, the geographic information and the intent to share are set in a preset sharing link.

In detail, in order to intuitively understand the geographic information and the intent to share of the marked position which is shared in viewing the shared items, the geographic information and the intent to share are taken as the parameters to be set in the preset sharing link.

It should be noted that, in an actual application, the geographic information and the intent to share set in the preset sharing link are in a standard format, which may follow a sharing link.

In detail, for different application scenes, in order to ensure that the geographic information and the intent to share set in the preset sharing link are in the standard format which may follow the sharing link, the geographic information and the intent to share may be set in the preset sharing link in different ways.

In a first example, format conversion is performed on the obtained geographic information and the intent to share based on the corresponding format, such that the geographic information and the intent to share converted into the standard format are taken as parameters to be set in the sharing link.

In a second example, a character format of the geographic information and the intent to share may be set in advance. For example, for the inputting box for obtaining the intent to share, the format of the received inputting character is set, such that the obtained geographic information and the intent to share are in the standard format, and the geographic information and the intent to share in the standard format are directly set in the sharing link.

In block S103, the preset sharing link is sent through a preset system interface corresponding to a target application.

It should be understood that, in order to satisfy the demand for sharing the position in different applications, the preset sharing link is sent through the preset system interface corresponding to the target application. For example, if the user hopes to perform the position sharing in the WeChat application, the user may send the sharing link through a system interface corresponding to the WeChat application, in which, the above interface of the target application may be API (Application programming interface) or SDK (Software Development Kit) provided by the target application.

It can be seen that, the above embodiment provides a function for sharing the position based on the panoramic map. The sharing terminal may determine the marked position on the panoramic map and the intent to share for the marked position, and add the geographic information and the intent to share of the marked position to the sharing link for sharing, such that the receiving terminal may acquire the shared position and the intent to share intuitively.

In order to describe the method for the sharing the position in embodiments of the present disclosure more clearly, examples will be made with reference to the specific application scene as follows.

In an actual application, in order to satisfy the demand that the transportation department accurately informs the public of some emergencies, the method for sharing the position in embodiments of the present disclosure may be employed to share the related position and the emergency handling information of the emergency with the public through the social platform.

Figure 2:
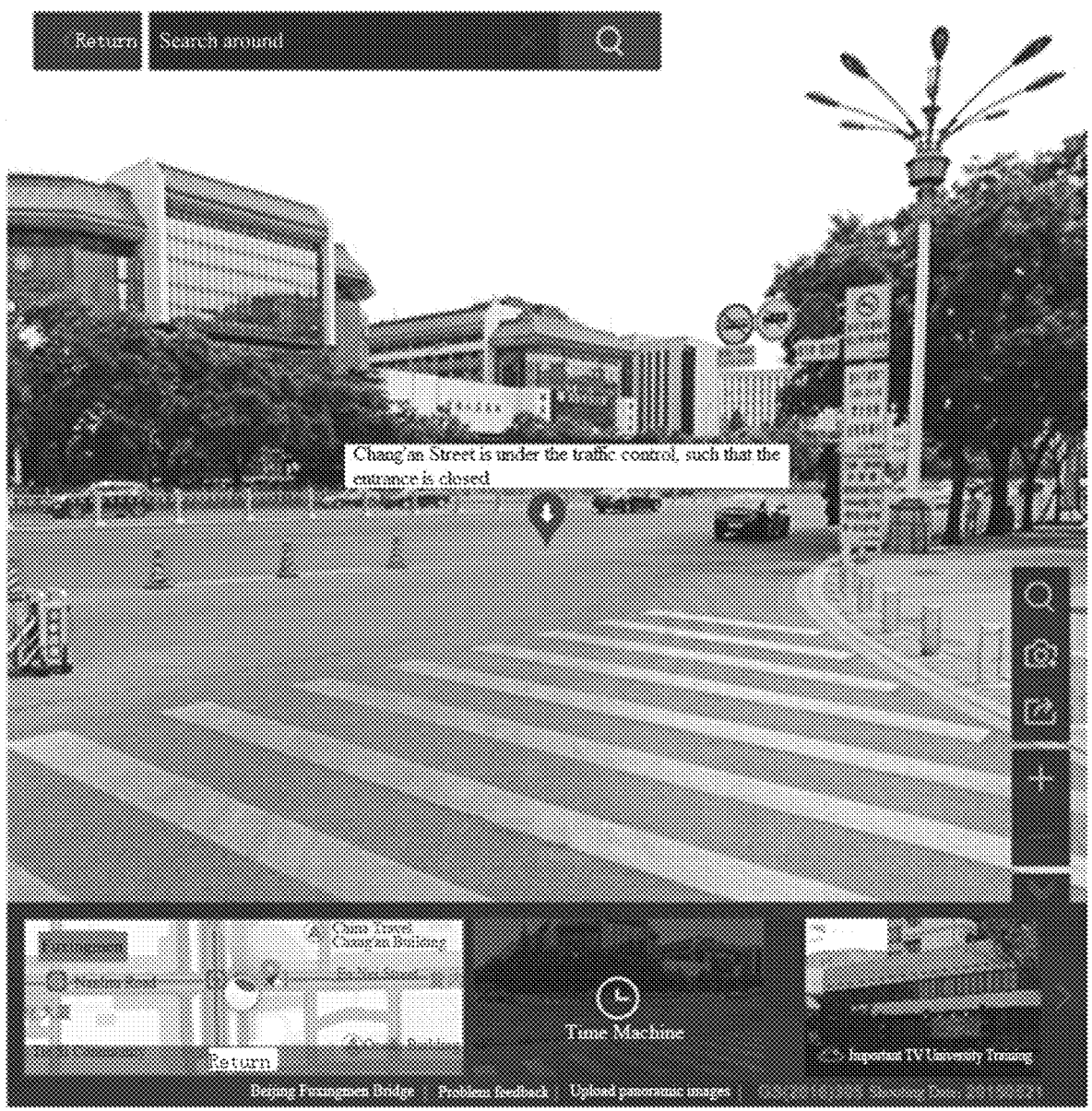
FIG. 2 is a schematic diagram illustrating a position sharing interface according to an embodiment of the present disclosure.

For example, the transportation department may mark specific crossroad positions under the traffic control on the panoramic map, and input the intent to share "Chang'an Street is under the traffic control, such that the entrance is closed", such that after setting the geographic information of the position of the street and the intent to share in the preset sharing link, as illustrated in FIG. 2, the driver may find which crossroads are closed on the panoramic map intuitively, and may change the driving routine in time.

In conclusion, with the method for sharing the position according to embodiments of the present disclosure, the geographic information and the intent to share corresponding to the marked position on the panoramic map are obtained, the geographic information and the intent to share are set in the preset sharing link, and the preset sharing link is sent through the preset system interface corresponding to the target application. In this way, the shared position is marked based on the panoramic map and the description information is added for the shared position, thus embodying the intent to share and the shared position intuitively, and improving the practicality of sharing the position.

Based on the above embodiment, in order to describe the method for sharing the position of embodiments of the present disclosure more clearly, the way of obtaining the geographic information and the intent to share corresponding to the marked position on the panoramic map is taken as a way illustrated by the first example in the above block S101, and the way of setting the geographic information and the intent to share in the preset sharing link is taken as a way illustrated by first example in the above block S102, which may be described in detailed as follows.

Figure 3:
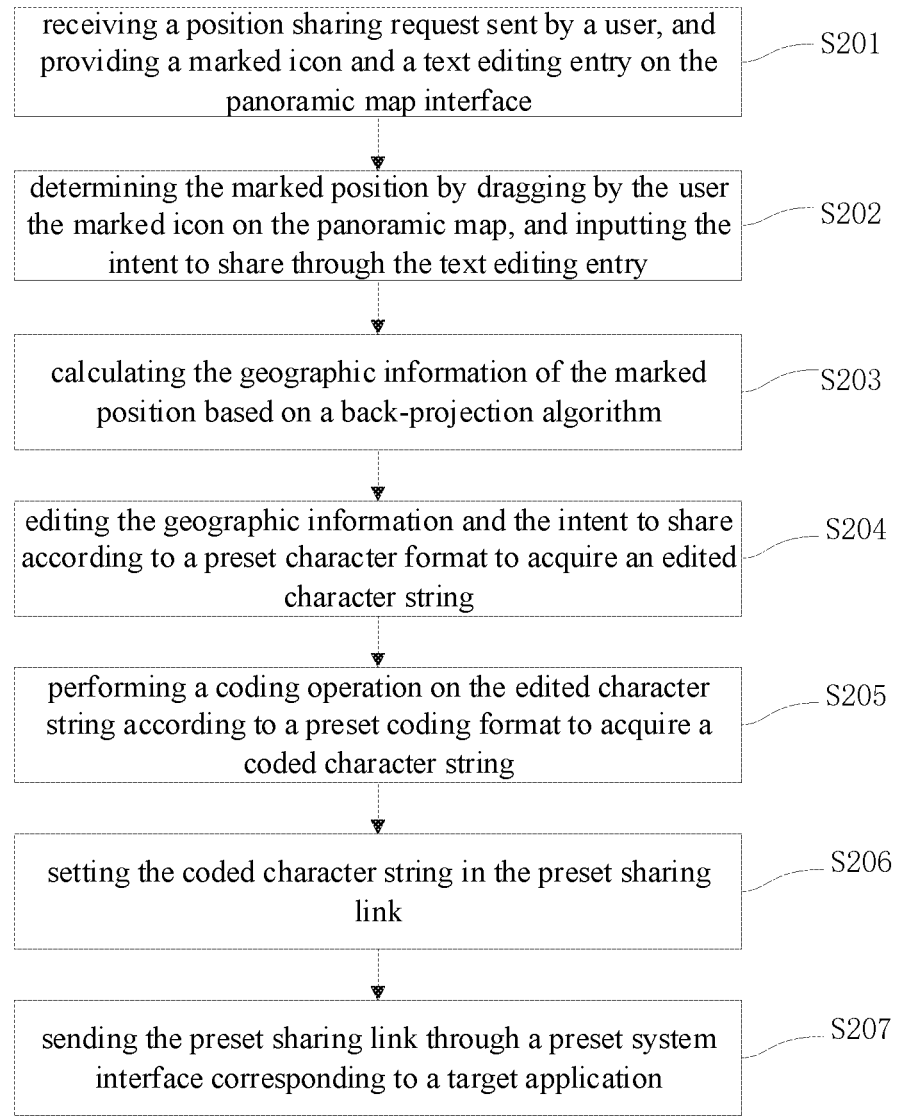
FIG. 3 is a flow chart illustrating a method for sharing a position according to another embodiment of the present disclosure.

FIG. 3 is a flow chart illustrating a method for sharing a position according to another embodiment of the present disclosure. As illustrated in FIG. 3, the method includes following blocks.

In block S201, a position sharing request sent by a user is received, and a marked icon and a text editing entry are provided on the panoramic map interface.

In detail, after receiving the position sharing request sent by the user, the marked icon and the text editing entry are provided on the panoramic map interface, in which, the marked icon is configured to indicate the marked position on the panoramic map, and the text editing entry is configured to input the intent to share of the marked position.

It should be noted that, for different application scenes, the position sharing request sent by the user may be triggered with different ways, such as by a sharing menu triggered by the user on the panoramic map, or by a speech instruction inputted by the user through the speech input interface on the panoramic map.

In block S202, the marked position is determined by dragging by the user the marked icon on the panoramic map, and the intent to share is input through the text editing entry.

In detail, the user may move the marked icon to the marked position by dragging the marked icon, such that the marked position is expressed intuitively by the marked icon, and the intent to share is input through the text editing entry.

Or, the user may move the marked position to the position where the marked icon is located by dragging the panoramic map, such that the marked position is expressed intuitively by the marked icon, and the intent to share is input through the text editing entry.

Figure 4:
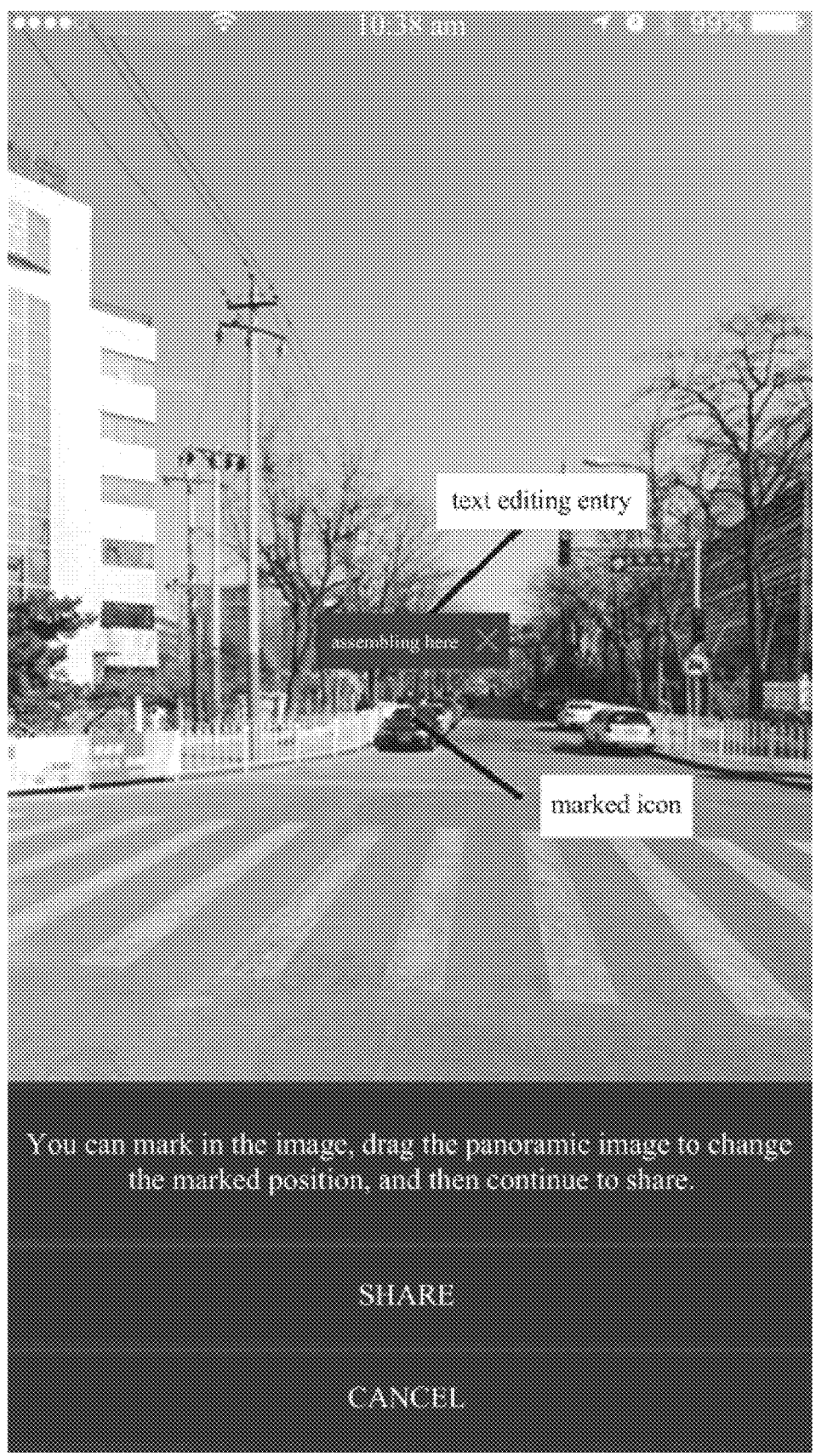
FIG. 4 is a schematic diagram illustrating a position sharing interface according to another embodiment of the present disclosure.

For example, as illustrated in FIG. 4, after detecting that the user clicks the "sharing" menu on the panoramic map interface, the marked icon and the text editing entry are provided in the center of the panoramic map interface.

The user may move the related position on the panoramic map to the marked icon by dragging the panoramic map, to implement determination for the marked position, and then the user may input the intent to share through the text editing entry, such as inputting "assembling here" to express an assembling place intuitively.

In an embodiment of the present disclosure, to improve efficiency for sharing the position, the intent to share input area provided by the text editing entry, in addition to providing a user-defined input area, may further provide some intent to share tags which are commonly used, such as "meeting", "assembling", such that a quick determination of the intent to share is implemented by selecting the intent to share tag.

In block S203, the geographic information of the marked position is calculated based on a back-projection algorithm.

In detail, after obtaining the marked position on the panoramic map, the geographic information of the marked position may be calculated by the related algorithm. For example, the geographic information of the marked position, such as coordinate, height, may be calculated by the back-projection algorithm.

In block S204, the geographic information and the intent to share are edited according to a preset character format to acquire an edited character string.

In detail, in order to ensure that the geographic information and the intent to share are in the standard format which may be set in the preset sharing link, the geographic information and the intent to share are edited according to the preset character format. For example, the geographic information and the intent to share are edited in a specific JSON (JavaScript Object Notation) format.

In block S205, a coding operation is performed on the edited character string according to a preset coding format to acquire a coded character string.

In detail, in order to ensure security and reliability of the sharing link, the coding operation may further be performed on the edited character string according to the preset coding format.

In block S206, the coded character string is set in the preset sharing link.

In block S207, the preset sharing link is sent through a preset system interface corresponding to a target application.

In detail, the coded character string is set in the preset sharing link, and the preset sharing link is sent through the preset system interface corresponding to the target application, to satisfy the demand that the user shares the position in the related application.

In conclusion, with the method for sharing the position according to embodiments of the present disclosure, the position sharing request sent by the user is received, the marked icon and the text editing entry are provided on the panoramic map interface, the marked position is determined by dragging by the user the marked icon on the panoramic map, the intent to share is input through the text editing entry, the geographic information of the marked position is calculated based on the back-projection algorithm, the geographic information and the intent to share are edited according to the preset character format to acquire the edited character string, the coding operation is performed on the edited character string according to the preset coding format to acquire the coded character string, the coded character string is set in the preset sharing link, and the preset sharing link is sent through the preset system interface corresponding to the target application. In this way, based on the marked icon and the character editing entry provided on the panoramic map interface, marking of the marked position and inputting of the intent to share may be implemented, such that the shared position is marked based on the panoramic map and the description information may be added for the shared position, thus embodying the intent to share and the shared position intuitively, and improving the practicality of sharing the position.

Based on the above embodiments, in an actual application, in order to share the position more accurately and satisfy under some application scenes the demand that the receiving terminal may view the marked position shared by the sharing terminal from the same perspective, the scene information where the current marked position is located may further be set in the sharing link.

Figure 5:
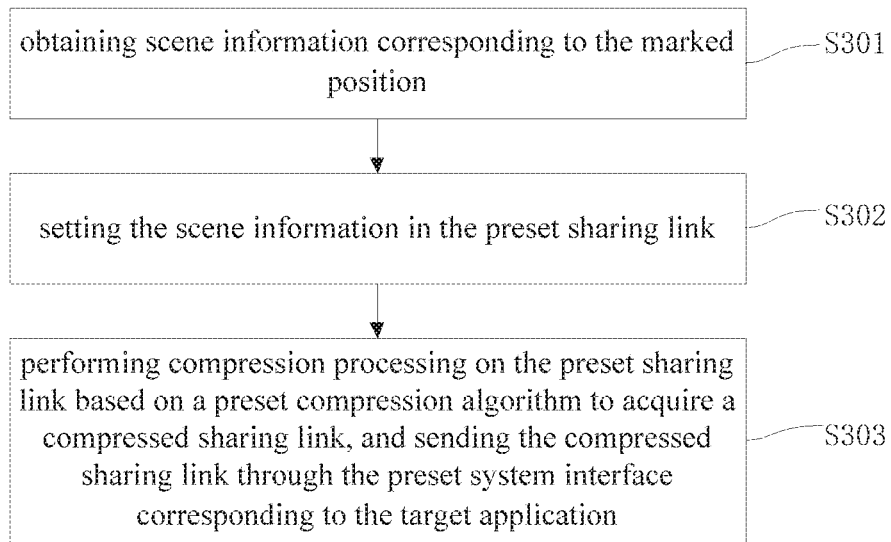
FIG. 5 is a flow chart illustrating a method for sharing a position according to a still embodiment of the present disclosure.

FIG. 5 is a flow chart illustrating a method for sharing a position according to a still embodiment of the present disclosure. As illustrated in FIG. 5, after the above block S102, the method further includes following blocks.

In block S301, the scene information corresponding to the marked position is obtained.

In detail, in order to share the position more accurately, the scene information corresponding to the marked position may further be obtained, in which, the scene information may include the scene type, the pitch angle, the orientation and the like.

For example, when the user shares the crossroad where the user is located, the user not only obtains the geographic information and the intent to share of the crossroad, but also obtains detailed scene information such as the orientation, the pitch angle and the like of the user relative to the crossroad.

In block S302, the scene information is set in the preset sharing link.

In detail, the scene information is set in the preset sharing link, such that the user of the receiving terminal may not only view the marked position and the intent to share intuitively, but also restore the viewing perspective of the sharing terminal, which facilitates to understand the accurate position where the user of the sharing terminal is located.

In block S303, compression processing is performed on the preset sharing link based on a preset compression algorithm to acquire a compressed sharing link, and the compressed sharing link is sent through the preset system interface corresponding to the target application.

It can be understood that, in the actual application, since the geographic information, the intent to share and the scene information are set in the preset sharing link, the preset sharing link is too long. If the preset sharing link is shared to the related application, it may not be artistic due to too much occupied space, or may not be shared due to that the number of words goes beyond a word number limit of the related application. Therefore, before sharing the preset sharing link, the corresponding compression processing may further be performed on the preset sharing link.

In detail, the compression processing is performed on the sharing link based on the preset compression algorithm, the compressed sharing link is sent through the preset system interface corresponding to the target application.

In conclusion, with the method for sharing the position according to embodiments of the present disclosure, the scene information where the marked position is located may further be added to the preset sharing link, such that the user of the receiving terminal may view the marked position from the same perspective. Therefore, the position may be shared further accurately, thus improving the user's experience.

The method for sharing the position of embodiments of the present disclosure is described from the receiving terminal side, which will be described as follows.

Figure 6:
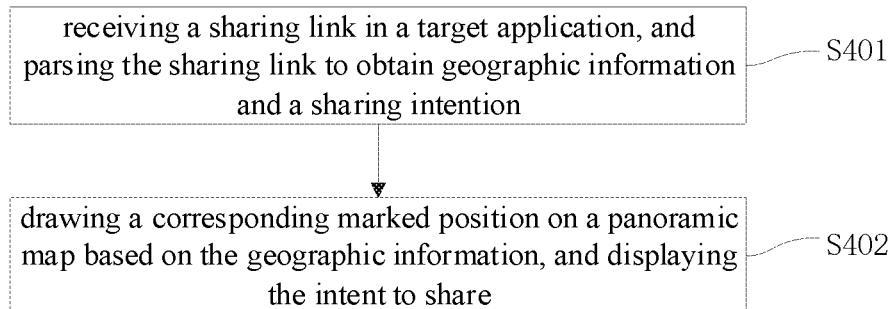
FIG. 6 is a flow chart illustrating a method for sharing a position according to still another embodiment of the present disclosure.

FIG. 6 is a flow chart illustrating a method for sharing a position according to still another embodiment of the present disclosure. As illustrated in FIG. 6, the method includes following blocks.

In block S401, a sharing link is received in a target application, and the sharing link is parsed to obtain geographic information and an intent to share.

In detail, after receiving the sharing link in the target application, when the sharing link is opened, the sharing link is parsed to obtain the geographic information and the intent to share, such that the specific position shared by the sharing terminal and the intent to share can be acquired.

It should be noted that, for different application scenes, the geography information and the intent to share set in the sharing link may be processed in different ways, such as by transcoding. Therefore, to obtain the specific position shared by the sharing terminal and the intent to share, the parsing needs to be performed on the sharing link by employing the corresponding parsing way.

In an embodiment of the present disclosure, if character string transcoding is performed on the geographic information and the intent to share and then coding processing is performed on the transcoded character string, decompression processing is performed on the sharing link based on a preset decompression algorithm to acquire a decompressed sharing link, the decompressed sharing link is parsed to obtain a coded character string, and the coded character string is decoded based on a preset decoding format to obtain the geographic information and the intent to share.

In addition, in an embodiment of the present disclosure, if the compression processing is performed on the sharing link, the decompression processing needs to be performed on the sharing link before parsing the sharing link to obtain the geographic information and the intent to share.

In block S402, a corresponding marked position is drawn on a panoramic map based on the geographic information, and the intent to share is displayed.

In detail, after parsing the geographic position and the intent to share in the sharing link, the corresponding marked position is drawn on the panoramic map based on the parsed geographic information, and the intent to share is displayed, such that the receiving terminal may acquire the shared position and the intent to share intuitively.

In conclusion, with the method for sharing the position according to embodiments of the present disclosure, the sharing link is received in the target application, the sharing link is parsed to obtain the geographic information and the intent to share, the corresponding marked position is drawn on the panoramic map based on the geographic information, and the intent to share is displayed. In this way, the shared position is drawn accurately based on the panoramic map, and the intent to share may be acquired intuitively, thus improving the practicality of sharing the position.

Based on the above embodiments, it should be noted that, when there is other scene information of the marked position in the sharing link, the receiving terminal may further draw the marked position on the panoramic map from the same perspective as the sharing terminal, to acquire the position where the user of the sharing terminal is located more accurately.

Figure 7:
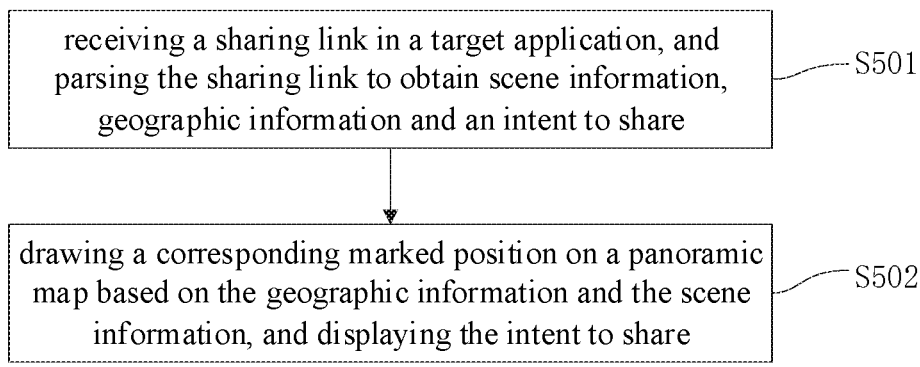
FIG. 7 is a flow chart illustrating a method for sharing a position according to a yet embodiment of the present disclosure.

FIG. 7 is a flow chart illustrating a method for sharing a position according to still another embodiment of the present disclosure. As illustrated in FIG. 7, the method includes following blocks.

In block S501, the sharing link is received in the target application, and the sharing link is parsed to obtain the scene information, geographic information and the intent to share.

In detail, after receiving the sharing link in the target application, when the sharing link is opened, the sharing link is parsed to obtain the scene information, geographic information and the intent to share, such that the specific position shared by the sharing terminal and the intent to share can be acquired from the same perspective as the sharing terminal.

The above scene information may include a specific scene type, pitch angle, orientation and the like of the scene where the marked position is located.

In block S502, a corresponding marked position is drawn on the panoramic map based on the geographic information and the scene information, and the intent to share is displayed.

In detail, after parsing the scene information, the geographic position and the intent to share in the sharing link, the corresponding marked position is drawn on the panoramic map based on the parsed scene information and geographic information, and the intent to share is displayed, such that the receiving terminal may acquire the shared position and the intent to share intuitively from the same perspective as the sharing terminal.

In conclusion, with the method for sharing the position according to embodiments of the present disclosure, the scene information where the marked position in the sharing link is located is parsed, such that the user of the receiving terminal may view the marked position on the panoramic map from the same perspective, and the shared position shared by the sharing terminal may further be acquired accurately, thus improving the user's experience.

Figure 8:
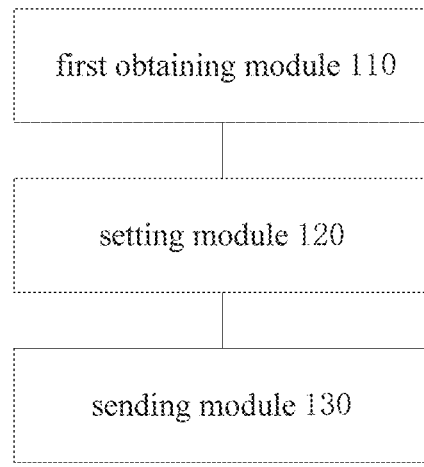
FIG. 8 is a block diagram illustrating a device for sharing a position according to a first embodiment of the present disclosure.

To achieve the above embodiments, the present disclosure further provides a device for sharing a position. FIG. 8 is a block diagram illustrating a device for sharing a position according to a first embodiment of the present disclosure. As illustrated in FIG. 8, the device for sharing the position includes a first obtaining module 110, a setting module 120 and a sending module 130.

The first obtaining module 110 is configured to obtain geographic information and an intent to share corresponding to a marked position on a panoramic map.

In detail, in order to find the shared position accurately, the first obtaining module 110 obtains unique geographic information indicating the marked position on the panoramic map, and in order to present the sharing purpose intuitively, the first obtaining module 110 obtains the intent to share corresponding to the marked position on the panoramic map.

The setting module 120 is configured to set the geographic information and the intent to share in a preset sharing link.

In detail, in order to intuitively understand the shared geographic information and the intent to share of the marked position which is shared in viewing the shared items, the setting module 120 takes the geographic information and the intent to share as parameters to be set in the preset sharing link.

The sending module 130 is configured to send the preset sharing link through a preset system interface corresponding to a target application.

It should be understood that, in order to satisfy the demand for sharing the position in different applications, the sending module 130 may send the sharing link through the preset system interface corresponding to the target application. For example, when the user hopes to share the position in the WeChat application, the sending module 130 may send the sharing link through a system interface corresponding to the WeChat application.

It should be noted that, the above explanation and illustration of the method for sharing the position may further be applied for describing the device for sharing the position, and the implementation principles of the method and the device are similar, which is not elaborated herein.

In conclusion, with the device for sharing the position according to embodiments of the present disclosure, the geographic information and the intent to share corresponding to the marked position on the panoramic map are obtained, the geographic information and the intent to share are set in the preset sharing link, and the preset sharing link is sent through the preset system interface corresponding to the target application. In this way, the shared position is marked based on the panoramic map and the description information may be added for the shared position, thus embodying the intent to share and the shared position intuitively, and improving the practicality of sharing the position.

Figure 9:
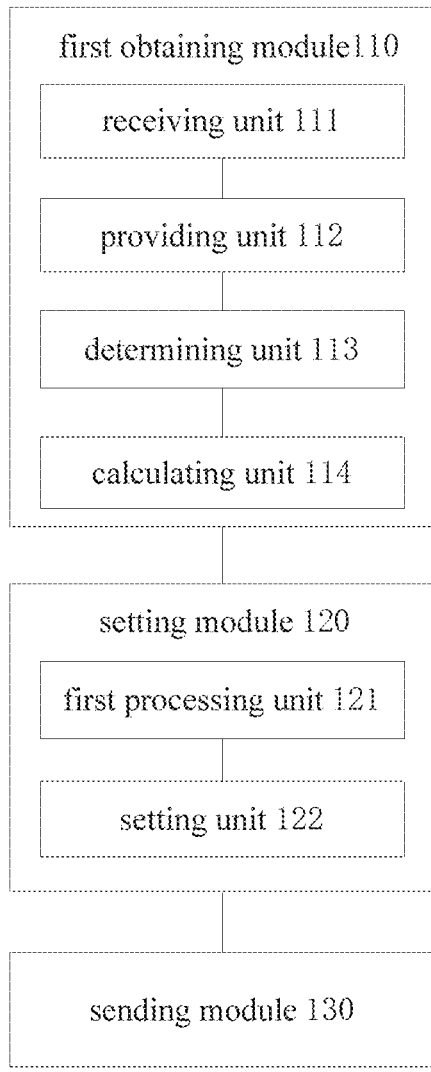
FIG. 9 is a block diagram illustrating a device for sharing a position according to a second embodiment of the present disclosure.

FIG. 9 is a block diagram illustrating a device for sharing a position according to a second embodiment of the present disclosure. As illustrated in FIG. 9, on the basis of what is illustrated in FIG. 8, the first obtaining module 110 may include a receiving unit 111, a providing unit 112, a determining unit 113 and a calculating unit 114. The setting module 120 may include a first processing unit 121 and a setting unit 122.

The receiving unit 111 is configured to receive a position sharing request sent by a user.

The providing unit 112 is configured to provide a marked icon and a text editing entry on a panoramic map interface.

In detail, after the receiving unit 111 receives the position sharing request sent by the user, the providing unit 112 provides the marked icon and the text editing entry on the panoramic map interface, in which, the marked icon is configured to indicate the marked position on the panoramic map, and the text editing entry is configured to input the intent to share of the marked position.

The determining unit 113 is configured to determine the marked position on the panoramic map by dragging by the user the marked icon, and to determine the intent to share based on an input from the user through the text editing entry.

In detail, the determining unit 113 may determine the marked position on the panoramic map by dragging by the user the marked icon, and determine the intent to share based on the input from the user through the text editing entry.

Or, the determining unit 113 may move the marked position to the position where the marked icon is located to determine the marked position by dragging by the user the panoramic map, and determine the intent to share based on the input from the user through the text editing entry.

The calculating unit 114 is configured to calculate the geographic information of the marked position based on a back-projection algorithm.

In detail, after obtaining the marked position on the panoramic map, the calculating unit 114 may calculate the geographic information of the marked position through the related algorithm. For example, the geographic information of the marked position, such as coordinate, height, may be calculated by the back-projection algorithm.

The first processing unit 121 is configured to edit the geographic information and the intent to share according to a preset character format to acquire an edited character string;

In detail, in order to ensure that the geographic information and the intent to share are in the standard format which may be set in the preset sharing link, the first processing unit 121 edits the geographic information and the intent to share according to the preset character format. For example, the geographic information and the intent to share are edited in a specific JSON format.

In an embodiment of the present disclosure, in order to ensure the security and the reliability of the sharing link, the first processing unit 121 is further configured to perform a coding operation on the edited character string based on a preset coding format to acquire a coded character string.

The setting unit 122 is configured to set the coded character string in the preset sharing link.

In detail, the setting unit 122 sets the coded character string in the preset sharing link, and the sending module 130 sends the preset sharing link through the system interface corresponding to the target application, to satisfy the demand that the user shares the position in the related application.

It should be noted that, the above explanation and illustration of the method for sharing the position is further applicable for describing the device for sharing the position of the present disclosure, and the implementation principles of the method for sharing the position and the device for sharing the position are similar, which will be not elaborated herein.

In conclusion, with the method for sharing the position according to embodiments of the present disclosure, the position sharing request sent by the user is received, and the marked icon and the text editing entry are provided on the panoramic map interface; the marked position is determined by the user dragging the marked icon on the panoramic map, the intent to share is input through the text editing entry, the geographic information of the marked position is calculated based on the back-projection algorithm, the geographic information and the intent to share are edited according to the preset character format to acquire the edited character string, the coding operation is performed on the edited character string according to the preset coding format to acquire the coded character string; the coded character string is set in the preset sharing link, and the preset sharing link is sent through the preset system interface corresponding to the target application. In this way, based on the marked icon and the text editing entry provided based on the panoramic map interface, marking of the marked position and inputting of the intent to share can be implemented, such that the shared position is marked based on the panoramic map and the description information may be added for the shared position, thus embodying the intent to share and the shared position intuitively, and improving the practicality of sharing the position.

Figure 10:
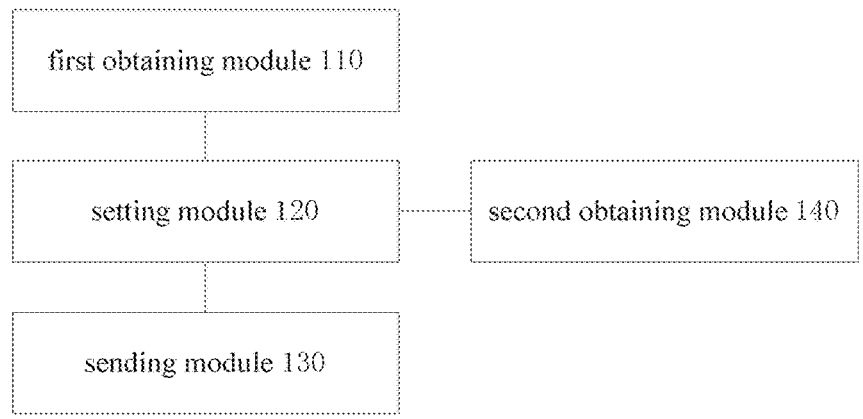
FIG. 10 is a block diagram illustrating a device for sharing a position according to a third embodiment of the present disclosure.

FIG. 10 is a block diagram illustrating a device for sharing a position according to a third embodiment of the present disclosure. As illustrated in FIG. 10, on the basis of what is illustrated in FIG. 8, the device for sharing the position may include a second obtaining module 140.

The second obtaining module 140 is configured to obtain scene information corresponding to the marked position.

In detail, in order to share the position more accurately, the second obtaining module 140 may further obtain the scene information corresponding to the marked position, in which, the scene information may include the scene type, the pitch angle, the orientation and the like.

Further, the setting module 120 sets the scene information in the preset sharing link.

It should be understood that, in an actual application, since the geographic information, the intent to share and the scene information are set in the preset sharing link, the preset sharing link is too long. If the preset sharing link is shared to the related application, it may not be artistic due to too much occupied space, or may not be shared due to that the number of words goes beyond a word number limit of the related application. Therefore, before sharing the preset sharing link, the corresponding compression processing may further be performed on the preset sharing link.

In an embodiment of the present disclosure, the sending module 130 is further configured to perform compression processing on the preset sharing link based on a preset compression algorithm to acquire a compressed sharing link, and send the compressed sharing link through the preset system interface corresponding to the target application.

It should be noted that, the above explanation and illustration of the method for sharing the position is further applicable for describing the device for sharing the position of the present disclosure, and the implementation principles of the method for sharing the position and the device for sharing the position are similar, which will be not elaborated herein.

In conclusion, with the device for sharing the position according to embodiments of the present disclosure, the scene information where the marked position is located may be added to the preset sharing link, such that the user of the receiving terminal may view the marked position from the same perspective. Therefore, the position sharing may be further performed accurately, thus improving the user's experience.

Figure 11:
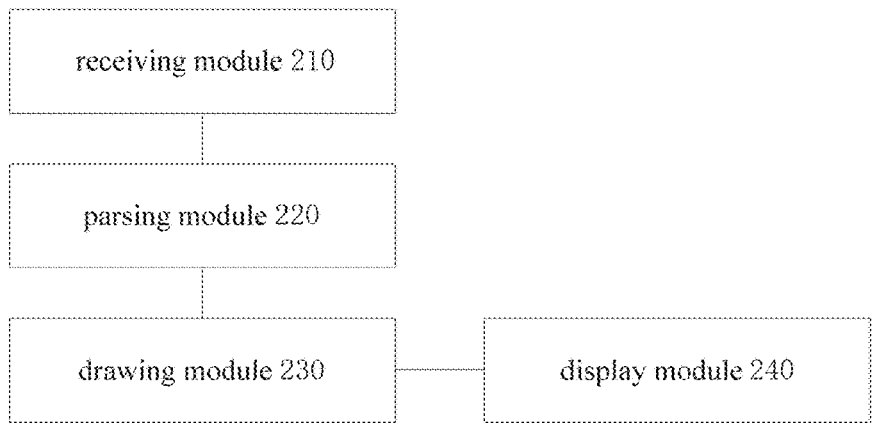
FIG. 11 is a block diagram illustrating a device for sharing a position according to a fourth embodiment of the present disclosure.

To achieve the above embodiments, the present disclosure further provides a block diagram illustrating another device for sharing a position. FIG. 11 is a block diagram illustrating a device for sharing a position according to a fourth embodiment of the present disclosure. As illustrated in FIG. 11, the device for sharing the position includes a receiving module 210, a parsing module 220, a drawing module 230 and a display module 240.

The receiving module 210 is configured to receive a sharing link in a target application.

The parsing module 220 is configured to parse the sharing link to obtain geographic information and an intent to share.

In detail, after the receiving module 210 receives the sharing link in the target application, when the sharing link is opened, the parsing module 220 parses the sharing link to obtain the geographic information and the intent to share, such that the specific position shared by the sharing terminal and the intent to share can be obtained.

Figure 12:
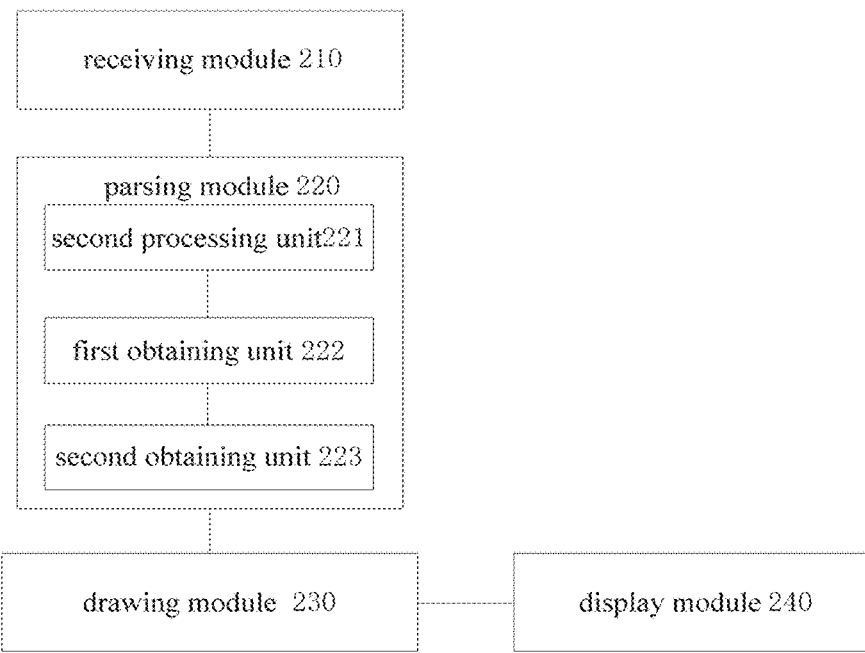
FIG. 12 is a block diagram illustrating a device for sharing a position according to a fifth embodiment of the present disclosure.

FIG. 12 is a block diagram illustrating a device for sharing a position according to a fifth embodiment of the present disclosure. As illustrated in FIG. 12, on the basis of what is illustrated in FIG. 11, the parsing module 220 may include a second processing unit 221, a first obtaining unit 222 and a second obtaining unit 223.

The second processing unit 221 is configured to perform decompression processing on the sharing link based on a preset decompression algorithm to acquire a decompressed sharing link;

The first obtaining unit 222 is configured to parse the decompressed sharing link to obtain a coded character string.

The second obtaining unit 223 is configured to decode the coded character string based on a preset decoding format to obtain the geographic information and the intent to share.

A drawing module 230 is configured to draw the corresponding marked position on the panoramic map based on the geographic information.

A displaying module 240 is configured to display the intent to share.

It should be noted that, the above explanation and illustration for the method for sharing the position may further be applied for describing the device for sharing the position, and the implementation principles of the method for sharing the position and the device for sharing the position are similar, which will be not elaborated herein.

In conclusion, with the device for sharing the position according to embodiments of the present disclosure, the sharing link is received in the target application, the sharing link is parsed to obtain the geographic information and the intent to share, the corresponding marked position is drawn on the panoramic map based on the geographic information, and the intent to share is displayed. In this way, the shared position is drawn accurately based on the panoramic map and the intent to share may be acquired intuitively, thus improving the practicality of sharing the position.

Based on the above embodiments, it should be understood that, when there is other scene information of the marked position in the sharing link, the receiving terminal may further draw the marked position on the panoramic map from the same perspective as the sharing terminal, to acquire the position where the user of the sharing terminal is located more accurately.

Figure 13:
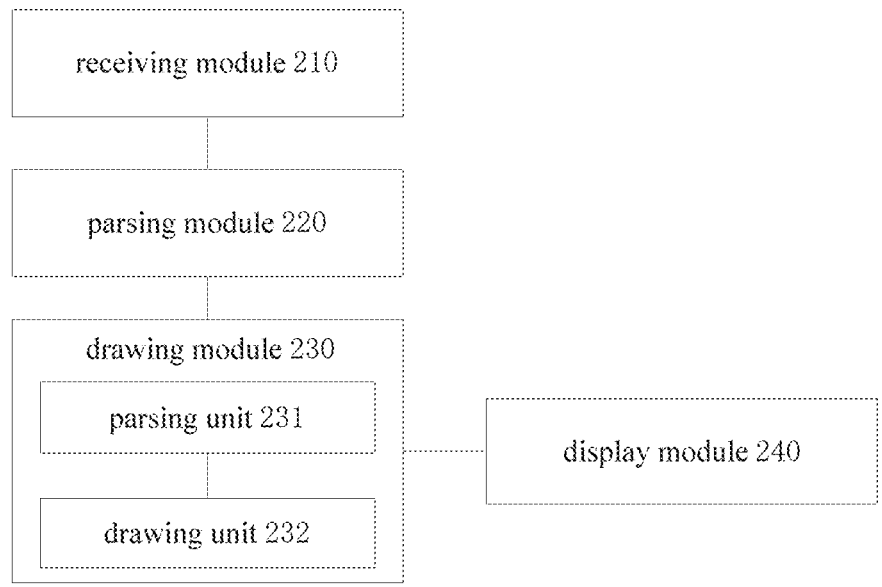
FIG. 13 is a block diagram illustrating a device for sharing a position according to a sixth embodiment of the present disclosure.

FIG. 13 is a block diagram illustrating a device for sharing a position according to a sixth embodiment of the present disclosure. As illustrated in FIG. 13, on the basis of what is illustrated in FIG. 11, the drawing module 230 includes a parsing unit 231 and a drawing unit 232.

The parsing unit 231 is configured to parse the sharing link to obtain scene information.

The drawing unit 232 is configured to draw the corresponding marked position on the panoramic map based on the scene information and the geographic information.

It should be noted that, the above explanation and illustration for the method for sharing the position may further be applied for describing the device for sharing the position, and the implementation principles of the method for sharing the position and the device for sharing the position are similar, which will be not elaborated herein.

In conclusion, with the device for sharing the position according to embodiments of the present disclosure, the scene information where the marked position in the sharing link is located is parsed, such that the user of the receiving terminal may view the marked position on the panoramic map from the same perspective. The shared position shared by the sharing terminal may further be acquired accurately, thus improving the user's experience.

Figure 14:
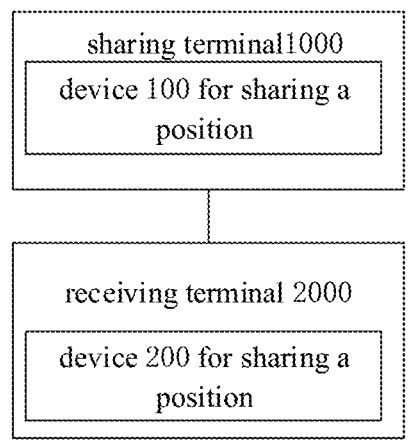
FIG. 14 is a block diagram illustrating a system for sharing a position according to an embodiment of the present disclosure.

To achieve the above embodiments, the present disclosure further provides a system for sharing a position. FIG. 14 is a block diagram illustrating a system for sharing a position according to an embodiment of the present disclosure. As illustrated in FIG. 14, the system for sharing the position includes a sharing terminal 1000 and a receiving terminal 2000. The sharing terminal 1000 includes a device 100 for sharing the position. The device 100 for sharing the position corresponds to one of the devices for sharing the position described with reference to the above accompanying drawings 8-10, which is not elaborated herein.

The receiving terminal 2000 includes a device 200 for sharing a position, and the device 200 for sharing the position corresponds to one of the devices for sharing the position described with reference the above accompanying drawings 11-13, which is not elaborated herein.

In conclusion, with the system for sharing a position according to embodiments of the present disclosure, the receiving terminal obtains the geographic information and the intent to share corresponding to the marked position on the panoramic map from the sharing terminal, the sharing terminal sets the geographic information and the intent to share in the preset sharing link, and sends the preset sharing link to the receiving terminal through the present system interface corresponding to the target application. In this way, the shared position is marked based on the panoramic map and the description information may be added for the shared position, thus embodying the intent to share and the shared position intuitively, and improving the practicality of sharing the position.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without a contradiction, the different embodiments or examples and the features of the different embodiments or examples can be combined by those skilled in the art.

Although embodiments of the present disclosure have been shown and described above. It should be understood that, the above embodiments are exemplary, and it would not be appreciated to limit the present disclosure, and those skilled in the art may make changes, alternatives, modifications and variations in the embodiments without departing from scope of the present disclosure.

What is claimed is:

1. A method for sharing a position in a panoramic electronic map product installed on an electronic device, comprising:
   receiving, by the panoramic electronic map product, a position sharing request when a sharing menu on the panoramic electronic map product is triggered by a user;
   providing, by the panoramic electronic map product, a marked icon and a text editing entry in a center of a panoramic map interface, based on the position sharing request;
   determining, by the panoramic electronic map product, a marked position through dragging the marked icon by the user to a position to be marked on the panoramic map;
   determining, by the panoramic electronic map product, a sharing intention based on an input from the user through the text editing entry;
   displaying, by the panoramic electronic map product, the marked icon and the sharing intention at the marked position;
   calculating geographic information of the marked position based on a back-projection algorithm;
   setting, by the panoramic electronic map product, the geographic information and the sharing intention in a preset sharing link; and
   sending, by the panoramic electronic map product, the preset sharing link through a preset system interface corresponding to a target application.

2. The method according to claim 1, wherein, setting, by the panoramic electronic map product, the geographic information and the sharing intention in the preset sharing link, comprises:
   editing, by the panoramic electronic map product, the geographic information and the sharing intention according to a preset character format to acquire an edited character string;
   performing, by the panoramic electronic map product, a coding operation on the edited character string according to a preset coding format to acquire a coded character string; and
   setting, by the panoramic electronic map product, the coded character string in the preset sharing link.

3. The method according to claim 1, after setting, by the panoramic electronic map product, the geographic information and the sharing intention in the preset sharing link, further comprising:
   obtaining, by the panoramic electronic map product, scene information corresponding to the marked position, in which the scene information includes a scene type, a pitch angle and an orientation;
   setting, by the panoramic electronic map product, the scene information in the preset sharing link.

4. The method according to claim 1, wherein, sending, by the panoramic electronic map product, the preset sharing link through the preset system interface corresponding to the target application, further comprises:
   performing, by the panoramic electronic map product, compression processing on the preset sharing link based on a preset compression algorithm to acquire a compressed sharing link, and sending, by the panoramic electronic map product, the compressed sharing link through the preset system interface corresponding to the target application.

5. The method according to claim 1, wherein, obtaining, by the panoramic electronic map product, the geographic information and the sharing intention corresponding to the marked position on the panoramic map, comprises:
   receiving, by the panoramic electronic map product, the sharing intention through a sharing intention description box preset on the panoramic map;
   determining, by the panoramic electronic map product, the marked position when detecting a preset action at a preset position on the panoramic map; and
   calculating, by the panoramic electronic map product, the geographic information of the marked position based on a back-projection algorithm.

6. The method according to claim 1, further comprising:
   receiving, by the panoramic electronic map product, the sharing intention through a sharing intention editing entry preset on the panoramic map; and
   receiving, by the panoramic electronic map product, the geographic information of the marked position through a geographic information input entry.

7. The method according to claim 1, further comprising:
   performing, by the panoramic electronic map product, a format conversion on the geographic information and the sharing intention to acquire the geographic information in a standard format and the sharing intention in a standard format; and
   setting, by the panoramic electronic map product, the geographic information in the standard format and the sharing intention in the standard format in the preset sharing link.

8. The method according to claim 1, further comprising:
   providing, by the panoramic electronic map product, a speech receiving entry on the panoramic map interface, and receiving speech information in the speech receiving entry inputted by the user;
   determining, by the panoramic electronic map product, the marked position through inputting by the user a related trajectory at a related position of the panoramic map interface; and
   calculating geographic information of the marked position based on a back-projection algorithm.

9. The method according to claim 1, further comprising:
   providing a plurality of sharing intention tags on the panoramic map interface for a quick determination of the sharing intention by the user.

10. The method according to claim 1, further comprising:
    determining, by the panoramic electronic map product, the marked position through dragging the panoramic map by the user to a position where the marked icon is located.

11. An electronic device for sharing a position where a panoramic electronic map product is installed, comprising:
    a processor;
    a memory, configured to store instructions executable by the processor;
    the processor is configured to:

receive a position sharing request when a sharing menu on the panoramic electronic map product is triggered by a user;

provide a marked icon and a text editing entry on a panoramic map interface, based on the position sharing request;

determine a marked position through dragging the marked icon by the user to a position to be marked on the panoramic map;

determine a sharing intention based on an input from the user through the text editing entry;

display the marked icon and the sharing intention at the marked position;

calculate geographic information of the marked position based on a back-projection algorithm;

set the geographic information and the sharing intention in a preset sharing link; and send the preset sharing link through a preset system interface corresponding to a target application.

12. The electronic device according to claim 11, wherein, the processor is configured to set the geographic information and the sharing intention in the preset sharing link by performing following operations:

editing the geographic information and the sharing intention according to a preset character format to acquire an edited character string;

performing a coding operation on the edited character string according to a preset coding format to acquire a coded character string; and setting the coded character string in the preset sharing link.

13. The electronic device according to claim 11, wherein the processor is further configured to:

obtain scene information corresponding to the marked position, in which the scene information includes a scene type, a pitch angle and an orientation;

set the scene information in the preset sharing link.

14. The electronic device according to claim 11, wherein, the processor is configured to send the preset sharing link through the preset system interface corresponding to the target application by performing following operations:

performing compression processing on the preset sharing link based on a preset compression algorithm to acquire a compressed sharing link, and sending the compressed sharing link through the preset system interface corresponding to the target application.

15. An electronic device for sharing a position where a panoramic electronic map product is installed, comprising:

a processor;

a memory, configured to store instructions executable by the processor;

the processor is configured to:

send a position sharing request when a sharing menu on the panoramic electronic map product is triggered by a user;

receive a sharing link in the panoramic electronic map product, and parse the sharing link to obtain geographic information and a sharing intention; and draw a corresponding marked position on a panoramic map based on the geographic information; and display a marked icon and the sharing intention at the marked position on the panoramic map interface;

wherein the sharing intention is determined based on an input from the user through a text editing entry on the panoramic map interface, and the geographic information of the marked position is calculated based on a back-projection algorithm.

16. The electronic device according to claim 15, wherein, the processor is configured to parse the sharing link to obtain the geographic information and the sharing intention by performing following operations:

performing decompression processing on the sharing link based on a preset decompression algorithm to acquire a decompressed sharing link;

parsing the decompressed sharing link, to obtain a coded character string;

decoding the coded character string based on a preset decoding format to obtain the geographic information and the sharing intention.

17. The electronic device according to claim 15, wherein, the processor is configured to draw the corresponding marked position on the panoramic map based on the geographic information by performing following operations:

parsing the sharing link to obtain scene information;

drawing the corresponding marked position on the panoramic map based on the scene information and the geographic information.

\* \* \* \* \*